United States Patent [19]

Turner

[11] Patent Number: 5,382,070
[45] Date of Patent: Jan. 17, 1995

[54] AERO DEFLECTOR FOR VEHICLES

[75] Inventor: Douglas A. Turner, Costa Mesa, Calif.

[73] Assignee: G.T. Styling, Inc., Irvine, Calif.

[21] Appl. No.: 231,987

[22] Filed: Apr. 21, 1994

Related U.S. Application Data

[63] Continuation of Ser. No. 962,838, Oct. 19, 1992, abandoned.

[51] Int. Cl.⁶ .............................................. B62D 35/00
[52] U.S. Cl. ................................. 296/180.1; 296/91
[58] Field of Search ............... 296/180.1, 180.2, 91, 296/96.15, 180.4

[56] References Cited

U.S. PATENT DOCUMENTS

| | | | |
|---|---|---|---|
| 2,919,952 | 1/1960 | Riddle et al. | 296/91 |
| 3,059,562 | 10/1962 | Sturtevant et al. | 98/2 |
| 3,596,975 | 8/1971 | Stephen | 296/91 |
| 4,174,863 | 11/1979 | Gotz | 296/91 |
| 4,179,154 | 12/1979 | Ingram | 296/91 |
| 4,357,045 | 11/1982 | Kinford, Jr. | |
| 4,674,788 | 6/1987 | Ohmura et al. | 296/91 |
| 4,703,970 | 11/1987 | Gorka | |
| 4,726,618 | 2/1988 | Hansen | 296/91 |
| 4,750,782 | 6/1988 | Turner | 296/217 |
| 4,881,772 | 11/1989 | Feinberg | 296/91 |
| 5,018,779 | 5/1991 | Lund | 296/180.1 |
| 5,060,340 | 10/1991 | Grassini | 296/180.1 X |
| 5,199,762 | 4/1993 | Scheele et al. | 296/180.1 |

FOREIGN PATENT DOCUMENTS

| | | |
|---|---|---|
| 2501708 | 9/1982 | France |
| 2553052 | 4/1985 | France |

OTHER PUBLICATIONS

Letter to President, G.T. Styling; Hartung, Kirk M.; re Dual Lock Securement of Deflector Shields, Jul. 24, 1992.

Parts & Accessories Catalog No. 525D; J. C. Whitney & Co.; prior to Feb. 28, 1991; pp. 22, 47, 119, 120, 121 and 122.

*Primary Examiner*—Joseph Pape
*Attorney, Agent, or Firm*—Spensley Horn Jubas & Lubitz

[57] ABSTRACT

An aero deflector for vehicles including, for example, trucks, vans, and sports utility vehicles. In the illustrated embodiment, the aero deflector is molded from a single piece of material and has a plurality of air intakes and a conforming mounting flange which is attached to the vehicle surface by adhesive mounting tape.

34 Claims, 2 Drawing Sheets

AERO DEFLECTOR FOR VEHICLES

This is a continuation of application Ser. No. 07/962,838 filed on Oct. 19, 1992, now abandoned.

FIELD OF THE INVENTION

This invention relates to an improved aero deflector for vehicles including, for example, trucks, vans, and sports utility vehicles.

BACKGROUND OF THE INVENTION

A vehicle passing along a roadway, particularly a flat back van or sports utility vehicle, produces a partial vacuum and wake behind it. The partial vacuum causes dirt, rain and other airborne particles to be sucked into and enter the wake. Many of these particles are subsequently deposited on the rear of the vehicle, including the rear window.

In the past, a relatively flat deflector has been mounted on the back of the vehicle to divert air passing over the vehicle and direct it down over the rear of the vehicle. An example of this flat air deflector type system is shown in FIG. 5. The flat air deflector 70 includes an air deflector bar 72 supported at an angle by multiple stanchions 74 to deflect air downwardly over the rear of the vehicle 100. The stanchions 74 are connected to mounting bases 76 which are typically secured by screws 78 driven into the roof 106 of the vehicle 100. Such an attachment method damages the roof of the vehicle and often voids the new vehicle paint warranty and other warranties.

In addition, many previous deflectors such as the flat air deflector 70 depicted in FIG. 5 can create a certain amount of drag to the smooth flow of air over the vehicle. This drag is exacerbated by the relatively high profile of many prior deflectors and the abrupt manner in which the air is deflected downward.

SUMMARY OF THE INVENTION

It is an object of the present invention to provide an improved aero deflector obviating, for practical purposes, the above-mentioned limitations, particularly in a manner requiring a relatively uncomplicated mechanical arrangement.

An aero deflector in accordance with a preferred embodiment of the present invention comprises a frame with a leading edge conformed to the exterior shape of an upper portion of the vehicle exterior, and a frontal portion which defines a plurality of spaced air intake apertures positioned to receive a flow of air passing over the upper portion of the exterior of the vehicle and the leading edge. A flow directing portion positioned between the frontal portion and a trailing edge has a curved interior surface shaped to smoothly direct the flow of air received from the air intake apertures to the trailing edge so that the flow of air is exhausted downwardly over the rear exterior of the vehicle. Such an arrangement has been found to permit the aero deflector to have a relatively low profile and thereby reduce aerodynamic drag yet still provide a substantial flow of air down the rear of the vehicle to prevent the collection of soil on the rear window. In addition, the conforming leading edge of the aero deflector frame allows the aero deflector to be readily attached to the vehicle exterior using an adhesive thereby avoiding the need for screws and other similar types of damaging fasteners.

In the illustrative embodiment, the aero deflector is formed from a single piece of plastic which is molded to form a partial enclosure which is mounted transversely to the rear exterior of the vehicle. The enclosure is securely affixed to the vehicle by means of double-sided adhesive tape applied between the conforming leading edge of the enclosure and the vehicle itself. The overall shape of the deflector is molded to conform to the general lines of the vehicle exterior to complement the style of the vehicle while maintaining a substantial flow of air over the rear window of the vehicle.

These and other objects and advantages will come apparent from the detailed description, taken in conjunction with the accompanying drawings.

DETAILED DESCRIPTION OF THE DRAWINGS

An aero deflector in accordance with a preferred embodiment of the present invention is indicated generally at 10 in FIGS. 1–4. The aero deflector 10 is preferably mounted on the rear of a vehicle 100 having a relatively vertical rear window 104, such as, for example, trucks, vans and sport utility vehicles. It is appreciated, of course, that the aero deflector 10 may be used on other types of vehicles as well.

Figure 2:
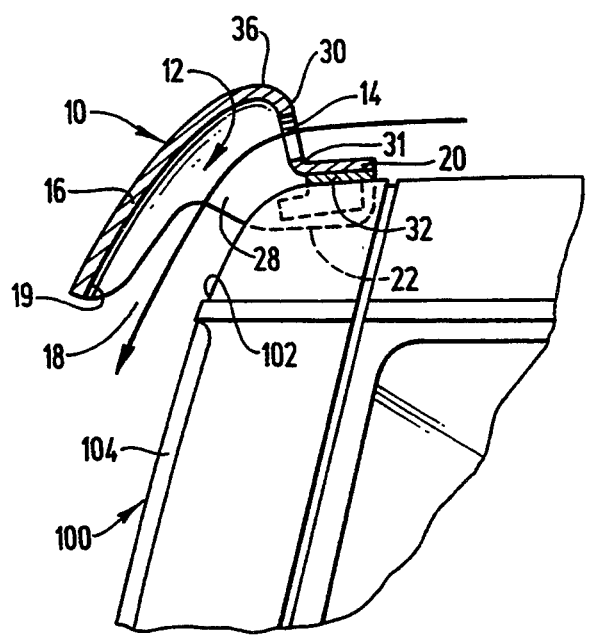
FIG. 2. is a cross-sectional view of the aero deflector of FIG. 1. as viewed along the lines 2—2 of FIG. 1.
Figure 3:
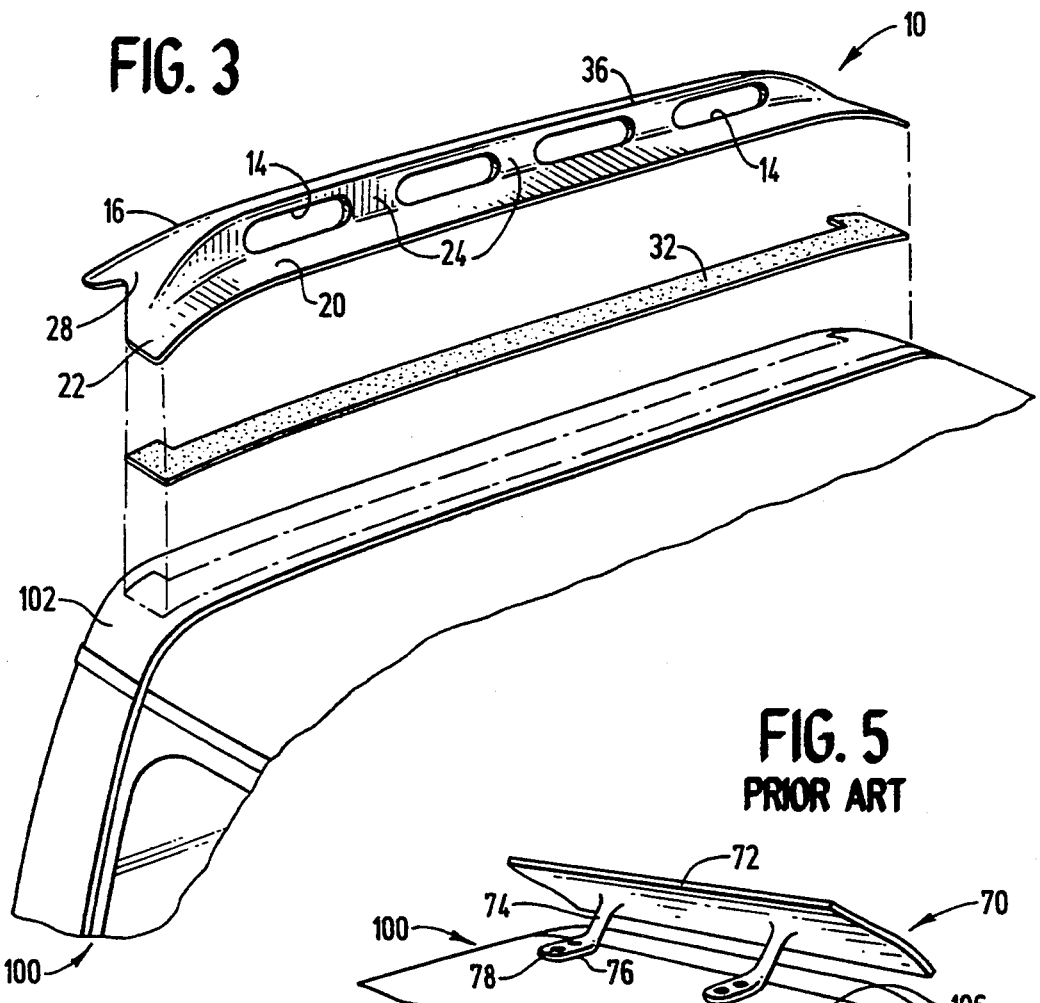
FIG. 3. is an exploded perspective view of the aero deflector of FIG. 1.
Figure 5:
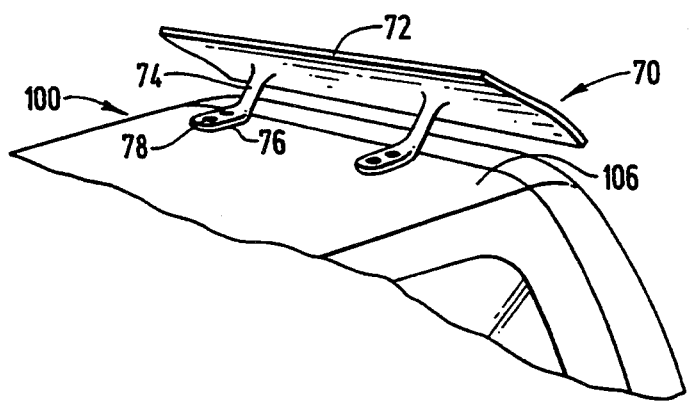
FIG. 5. is a prior art rear deflector.

The aero deflector 10, when mounted on the exterior surface 102 of the vehicle 100, forms an enclosure 12 (FIG. 2) between the aero deflector 10 and the vehicle exterior surface 102. As best seen in FIGS. 2 and 3, the deflector 10 has a plurality of air intakes 14 which admit a horizontal flow of air into the enclosure 12. Once admitted, the air is deflected by an inner concave curved surface of an air deflector portion 16 as the air flows through the enclosure until it is deflected to a generally vertical, downward direction. The downward flowing air flows out a rear exhaust 18 formed between a trailing edge 19 and the surface 102 of the vehicle to clean the rear of the vehicle. The aero deflector 10 is mounted to the vehicle using a mounting flange having a generally horizontal leading edge or leading edge flange 20 and a side edge flange 22. As explained in greater detail below, the flanges 20 and 22 conform to the curves of the vehicle exterior surface 102 in a manner which allows the deflector 10 to be attached using only an adhesive. To complete the enclosure 12, side walls 28 slope gradually down from the air deflector portion 16 to join with the side edge flange 22. As a result, air enters the enclosure 12 only through the air intakes 14, is deflected by the curved air deflector portion 16 and is thus exhausted out the rear exhaust 18 of the enclosure 12 in a smooth transition. In preferred embodiments, the air deflector portion is typically angled to deflect air between 30° to 50°, although other deflection angles may be used.

The air intakes 14 are formed in a generally vertically oriented frontal portion 30 as elongated ovals which extend in a direction parallel to the leading edge flange 20. The frontal portion 30 includes deflector supports 24, which separate the air intakes 14 and provide increased strength and stability to the air deflector portion 10. As can best seen in FIG. 2, the frontal portion 30 smoothly joins the leading edge flange 20 at an exterior concave curved portion 31 and smoothly joins the air deflector portion 16 at an exterior curved portion 36 to provide a low profile air flow entrance to the enclosure 12, which reduces air turbulence and blends into the overall design lines of the vehicle.

Figure 1:
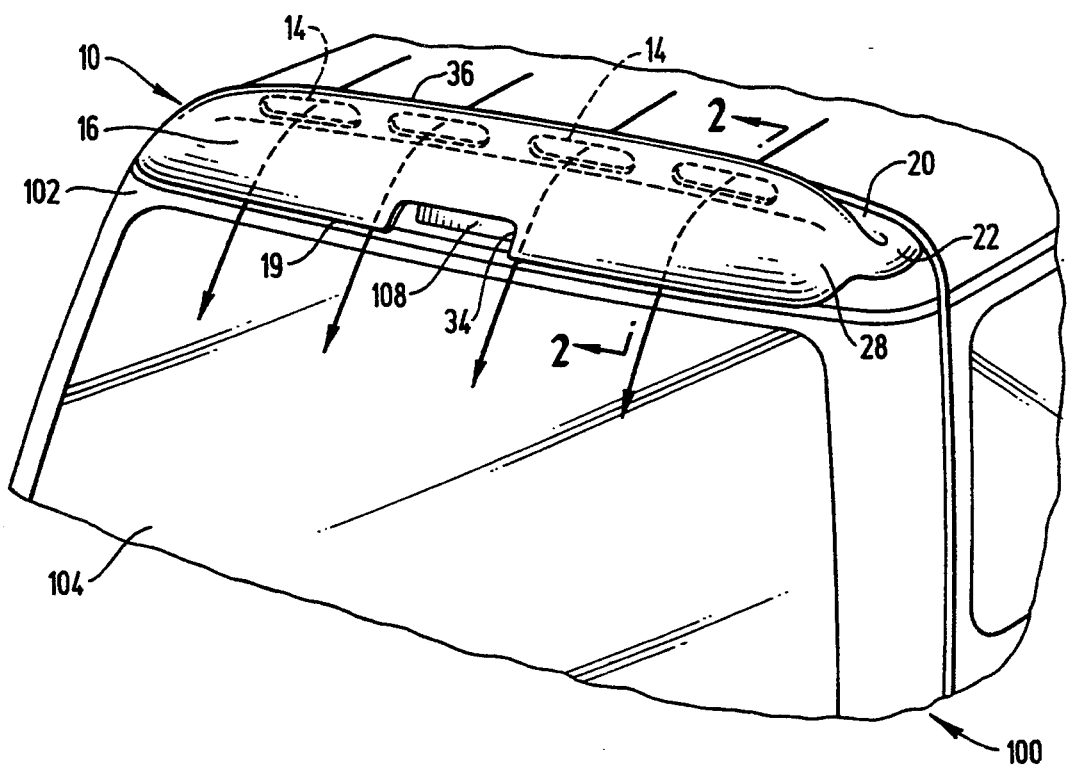
FIG. 1. is a perspective view of an aero deflector in accordance with a preferred embodiment of the present invention shown mounted on a utility vehicle.
Figure 4:
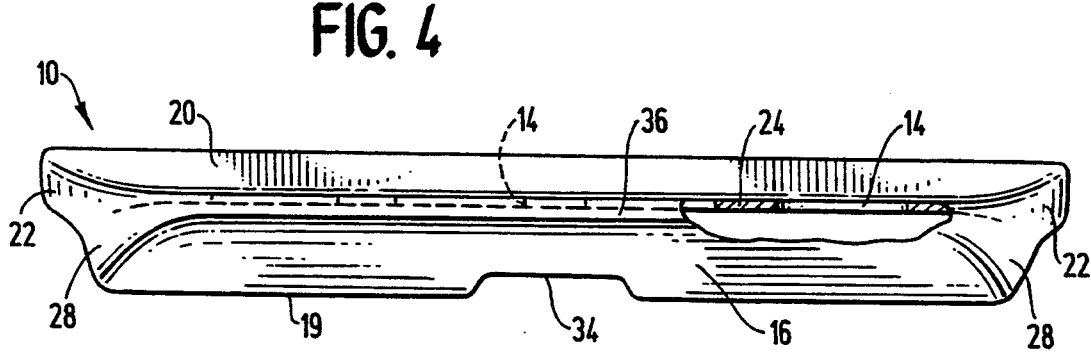
FIG. 4. is a top view of the aero deflector of FIG. 1.

FIGS. 1, 3 and 4 show that the air deflector portion 16, the frontal portion 20 and the sloping side walls 28 join in a series of smooth, gradual curved surfaces to give the deflector an aerodynamic profile that also blends into the vehicle lines. As a result, the deflector 10 not only has a very pleasing appearance, but is also believed to have reduced aerodynamic drag. As best seen in FIG. 2, inner concave surface of the air deflector portion 16 has a smoothly curved convex outer surface on the exterior of the air deflector 10 which is also believed to reduce turbulence and further enhance the blending of the design into the lines of the vehicle 100.

As previously mentioned, after the air flow is deflected by the air deflector portion 16, the air is exhausted out the rear of the enclosure 12. Referring to FIGS. 1-3, the rear exhaust 18 is formed by the trailing edge 19 and the exterior surface 102 of the vehicle 100 which is spaced from the trailing edge 19. The deflector 10 is preferably positioned on the vehicle so that the curved deflector portion 16 is generally parallel to the curved surface 102 of the vehicle 100 as shown in FIG. 2. Thus, the deflector 10 advantageously uses the exterior surface of the vehicle itself to provide one surface of the enclosure. When the air is exhausted out the rear exhaust 18, the flowing air breaks up the partial vacuum formed by forward movement of the vehicle 100 and sweeps off dirt and water particles which would otherwise accumulate on the rear window 104. Since the air flow from the rear exhaust 18 comes from the enclosure 12, it is believed to result in even coverage of the rear window 104.

As best seen in FIGS. 3 and 4, the leading edge flange 20 and the side edge flange 22 provide a complex curved mounting surface which attaches to the exterior surface 102 of the vehicle 100. The curve of this mounting surface preferably conforms to the complex contours of the vehicle's exterior surface 102. To attach the aero deflector 10 to the vehicle 100, a double sided adhesive 32, preferably adhesive tape, is applied to the under surface of the mounting flange including the leading edge flange 20 and side edge flange 22. The other side of the double sided adhesive 32 adheres to the vehicle exterior surface 102. Because the flanges 20 and 22 conform to the exterior surface 102, the aero deflector 10 is securely attached over substantially the entire flange area. As a result, the aero deflector 10 is securely attached in a manner that appears to blend into the vehicle 100 lines and also gives the appearance that the aero deflector 10 was installed or designed by the manufacturer.

The mounting system shown in FIGS. 1-4 permits easy installation without special tools or skills. An average person, of ordinary skill, can quickly install the device himself. The double sided adhesive 32 is also non-damaging to the structure of the vehicle 100, which is important to maintaining vehicle warranties and the water tight integrity of the vehicle 100. The double sided adhesive tape, manufactured by 3M, part number 3218 has been found to not damage the exterior paint. Other adhesive tapes may also be used.

To ensure that the aero deflector 10 is compatible with accessories such as third rear brake lights 108 or rear window wiper/washer assemblies, the trailing edge of the rear exhaust 18 may have a notch 34 cut into it. This notch is best seen in FIGS. 1 and 4, where the notch 34 allows visibility to the third rear brake light 108.

The aero deflector 10 as illustrated in FIGS. 1-4 is preferably made from a single molded piece of material, which can reduce the cost of manufacture and facilitate installation. The aero deflector 10 of the illustrated embodiment is fabricated using a single sheet of translucent tinted plexiglass. Other materials may also be used. Manufacture of the aero deflector 10 starts by cutting the outline of the aero deflector 10 from the sheet thereby removing excess material from the corners and sides. Next the air intakes 14 are cut out of the sheet. The sheet is then molded to form the mounting flanges 20 and 22 so that they conform to the curves of the exterior surface of the vehicle 102 to provide a good seal and proper surface for attachment. At the same time, the air intakes 14 are molded in the proper position, and the air deflector portion 16 and side walls 28 are curved and molded into the desired aerodynamic shape which complement the lines of the vehicle 100. Preferably, a cleaning solvent such as alcohol is applied to the deflector 10 (and the vehicle surface 102) before the adhesive tape is applied to ensure that it properly adheres to the deflector.

While a particular form of the invention has been illustrated and described, it will also be apparent that various modifications can be made without departing from the spirit and scope of the invention.

What is claimed is:

1. An aero deflector for a vehicle, comprising:
   a frame having a flange which defines a leading edge and adapted to be mounted by the flange to an exterior of the vehicle; a frontal support portion having a plurality of deflector supports coupled to the flange downstream of the leading edge of the flange and defining a forward air intake downstream of the leading edge of the flange between the plurality of deflector supports and the flange to receive a flow of air passing directly downstream over the leading edge of the flange between the plurality of deflector supports; a trailing edge spaced from the exterior of the vehicle and oriented generally downwardly to define a rear air exhaust; a flow directing portion supported by the frontal support portion downstream of the air intake spaced from the exterior of the vehicle and having an interior surface shaped to direct the flow of air received from the forward air intake to the rear air exhaust at the trailing edge so that the flow of air is directed by the exterior of the vehicle and the interior surface of the flow directing portion and is exhausted downwardly over the exterior of the vehicle; and
   means carried by the leading edge for coupling the leading edge of the frame to the exterior of the vehicle.

2. An aero deflector according to claim 1, wherein the frame has side walls so that the frame and exterior of the vehicle together define an enclosure such that air is admitted into and exhausted from the enclosure substantially only through the forward air intake and the air exhaust, respectively.

3. An aero deflector for a vehicle according to claim 2, wherein said aero deflector frame is formed from a single piece of molded material.

4. An aero deflector for a vehicle according to claim 3, wherein said single piece of molded material is made of plexiglass.

5. An aero deflector for a vehicle according to claim 1, wherein said means carried by the leading edge for coupling comprises an adhesive tape.

6. An aero deflector for a vehicle according to claim 1, wherein said aero deflector frame is molded to aerodynamically match with lines of the exterior of the vehicle.

7. An aero deflector for a vehicle according to claim 1, wherein said directing portion is angled to deflect air at an angle between 30°–50°.

8. An aero deflector for a vehicle according to claim 1, wherein said air intake comprises a plurality of separate air intakes, each separate air intake having the shape of an elongated slot parallel to said leading edge of said frame.

9. An aero deflector for a vehicle, comprising:
a frame having a leading edge and adapted to be mounted by the leading edge to an exterior of the vehicle; a frontal support portion coupled to the leading edge downstream of the leading edge and defining a forward air intake .positioned to receive a flow of air passing over the leading edge; a trailing edge spaced from the exterior of the vehicle and oriented generally downwardly to define a rear air exhaust, wherein said trailing edge further defines a notch in said directing portion allowing visibility and access to other accessory articles; a flow directing portion supported by the frontal support portion downstream of the air intake and having an interior surface shaped to direct the flow of air received from the forward air intake to the rear air exhaust at the trailing edge so that the flow of air is exhausted downwardly over the exterior of the vehicle; and
means carried by the leading edge for coupling the leading edge of the frame to the exterior of the vehicle.

10. An aero deflector for a vehicle having a predetermined width, comprising:
an air deflector portion for deflecting air having a leading edge and a trailing edge each having a width proportional to the width of the vehicle;
a mounting flange having a leading edge, a trailing edge, and a pair of side edges, said flange having a width proportional to the width of said vehicle and forming a conforming mounting surface conforming to a surface of said vehicle which is used to attach said leading edge of said mounting flange to said vehicle surface;
a plurality of air deflector support members connected and disposed along said width of said leading edge of said air deflector portion, and extending down to connect along said width of said trailing edge of said mounting flange, wherein an air intake is formed between said air deflector portion leading edge, a pair of said plurality of air deflector supports and said trailing edge of said mounting flange; and
a pair of air deflector side walls each extending down from said air deflector portion to connect with said mounting flange adjacent one of said pair of side edges, wherein a volume of air is enclosed by an inner surface of said pair of air deflector side walls and an inner surface of said air deflector portion, such that when said vehicle moves air flows over said leading edge of said mounting flange through said air intakes into said enclosed volume of air to be deflected by said inner surface of said air deflector portion to flow out in a deflected direction past said trailing edge of said air deflector portion.

11. An aero deflector for a vehicle according to claim 10, wherein said aero deflector is formed from a single piece of molded material.

12. An aero deflector for a vehicle according to claim 11, wherein said single piece of molded material is made of plexiglass.

13. An aero deflector for a vehicle according to claim 10, wherein said leading edge of said mounting flange is attached to said vehicle by an adhesive tape.

14. An aero deflector for a vehicle according claim 10, wherein said aero deflector is molded to aerodynamically match with lines of said vehicle.

15. An aero deflector for a vehicle according to claim 10, wherein said air deflector portion is angled to deflect air at an angle between 30°–50°.

16. An aero deflector for a vehicle according to claim 10, wherein said air intake comprises a plurality of separate intakes, each separate air intake having the shape of an elongated slot parallel to said leading edge of said air deflector portion.

17. An aero deflector for a vehicle according to claim 10, wherein said trailing edge of said air deflector portion defines a notch allowing visibility and access to other accessory articles.

18. A method of deflecting air for a vehicle comprising the steps of:
admitting air into a frame which is mounted to a surface of the vehicle using a mounting flange, flowing air directly downstream over a leading edge of the mounting flange of the frame and into the frame through an air intake formed in the frame downstream from the mounting flange;
deflecting the flow of air using an angled inside surface of the frame to a downstream exhaust formed at the rear of the frame, such that the flow of air is directed by the inside surface of the frame and the surface of the vehicle; and
exhausting air out the rear exhaust of the frame over the surface of the vehicle.

19. A method of deflecting air for a vehicle according to claim 18, wherein the air intake is formed as a plurality of separate air intakes, such that each separate air intake is formed having the shape of an elongated slot parallel to the mounting flange.

20. A method of deflecting air for a vehicle comprising the steps of:
mounting a mounting flange of an enclosure onto an exterior surface of the vehicle;
admitting air flowing directly downstream over a leading edge of the mounting flange and into the enclosure through an air intake formed downstream in the enclosure behind the mounting flange;
deflecting the flow of air using an inside surface of the enclosure to a rear exhaust formed downstream at a rear portion of the enclosure, such that the flow of air is directed by the inside surface of the enclosure and the surface of the vehicle; and exhausting the deflected air out the rear exhaust of the enclosure over the surface of the vehicle.

21. A method of deflecting air for a vehicle according to claim 20, wherein the mounting of the mounting flange comprises attaching the mounting flange by an adhesive tape.

22. A method of deflecting air for a vehicle according to claim 21, wherein there is the additional step of forming the enclosure from a single piece of molded material.

23. A method of deflecting air for a vehicle according to claim 22, wherein the single piece of molded material is molded to aerodynamically match lines of the vehicle.

24. A method of deflecting air for a vehicle comprising the steps of:
   mounting a mounting flange of an enclosure onto an exterior surface of the vehicle;
   admitting air flowing over a leading edge of the mounting flange and into the enclosure through an air intake formed downstream in the enclosure behind the mounting flange;
   deflecting the flow of air using an inside surface of the enclosure to a rear exhaust formed downstream at a rear portion of the enclosure, wherein the rear exhaust is formed with a trailing edge defining a notch allowing access to accessory articles; and
   exhausting the deflected air out the rear exhaust of the enclosure over the surface of the vehicle.

25. A method of deflecting air for a vehicle according to claim 20, wherein the flow of air is deflected at a 30°–50° angle.

26. A method of deflecting air for a vehicle according to claim 20, wherein the air intake is formed as a plurality of separate air intakes, such that each separate air intake is formed having the shape of an elongated slot parallel to the mounting flange.

27. An aero deflector for a vehicle, comprising:
   a unitary member comprising a mounting flange, a flow directing surface spaced from the vehicle surface and an upstanding support defining an air intake positioned downstream of the mounting flange between the mounting flange and the flow directing surface so that air flows over the mounting flange, and directly downstream through the air intake and directed between the flow directing surface of the member and the surface of the vehicle.

28. An aero deflector according to claim 27, wherein the unitary member has side walls so that the unitary member and exterior of the vehicle together define an enclosure so that air is admitted into and exhausted from the enclosure substantially only through the air intake and the air exhaust, respectively.

29. An aero deflector according to claim 27, further including means carried by the mounting flange for coupling the mounting flange of the unitary member to the vehicle surface.

30. An aero deflector according to claim 29, wherein said means carried by the mounting flange for coupling comprises an adhesive tape.

31. An aero deflector according to claim 28, wherein said aero deflector unitary member is molded to aerodynamically match with lines of the surface of the vehicle.

32. An aero deflector according to claim 28, wherein said flow directing surface is angled to deflect air at an angle between 30°–50°.

33. An aero deflector according to claim 28, wherein said air intake comprises a plurality of separate air intakes, each separate air intake having the shape of an elongated slot parallel to said mounting flange of said unitary member.

34. An aero deflector for a vehicle, comprising:
   a unitary member comprising a mounting flange, a flow directing surface spaced from the vehicle surface and an upstanding support defining an air intake positioned between the mounting flange and the flow directing surface so that air flows over the mounting flange, through the air intake and under the flow directing surface of the member, wherein the unitary member has side walls so that the unitary member and exterior of the vehicle together define an enclosure so that air is admitted into and exhausted from the enclosure substantially only through the air intake and the air exhaust, respectively, and wherein said flow directing surface further includes a notch in said flow directing surface allowing visibility and access to other accessory articles.

* * * * *